July 7, 1931. J. A. SPENCER 1,813,776

THERMOSTAT

Filed Aug. 1, 1925

INVENTOR
John A. Spencer
BY
Delor G. Haynes
ATTORNEY

Patented July 7, 1931

1,813,776

UNITED STATES PATENT OFFICE

JOHN A. SPENCER, OF REVERE, MASSACHUSETTS, ASSIGNOR TO SPENCER THERMOSTAT COMPANY, OF CAMBRIDGE, MASSACHUSETTS, A CORPORATION OF MASSACHUSETTS

THERMOSTAT

Original application filed June 1, 1922, Serial No. 565,244. Divided and this application filed August 1, 1925. Serial No. 47,486.

The present invention relates to the thermostatic control devices and more particularly to the general type of devices described in my Patent Number 1,448,240, filed April 8, 1921 and granted March 13, 1923.

This application is a division of my patent application, Serial No. 565,244, filed June 1, 1922, now Patent 1,602,510, granted October 12, 1926.

The ordinary thermostat comprising a composite, flat sheet of two different metals in intimate contact has long been in use but it possesses the disadvantage of gradual motion, that is, small internal stresses caused by a rise in temperature produce correspondingly small movements in the device. Such devices are inapplicable where sudden and positive functioning is desirable, as, for example, in opening electrical circuits, as the slow motion of the devices tends to cause an arc between the contacts. My earlier application, Serial No. 459,773, now Patent No. 1,448,240, discloses a thermostatic control device, which, by virtue of its configuration, offers a relatively high resistance to small internal stresses caused by the temperature changes. At predetermined temperatures, however, the stresses induced in the device become sufficient to overcome this resistance and the thermostat suddenly changes its configuration. A specific form of my previous invention contemplated the use of a non-developable surface for the thermostatic element, as a means for producing the resistance to small stresses, and consequent positive action of the device.

According to the present invention, a quick acting thermostatic control is secured by providing a flexible, normally flat, thermostatic strip or sheet, which is arched or bent between its ends. With a thermostatic strip arched in this manner a tendency to change shape, due to changes in temperature, is initially resisted until a certain temperature is reached, when thereafter the strip suddenly changes to a shape of opposite curvature. In a simple form of the invention, a thermostatic strip is retained in a bowed or arched shape by the connection of its opposite ends with a substantially rigid support. It is to be understood that the phrase substantially rigid refers to the opposition that the support offers to separation of its points of attachment with the thermostatic strip, and does not refer to the lateral pliability of this support. The initial changes of temperature do not substantially affect the shape of such a construction but when the change of temperature has reached a predetermined point the bowed strip suddenly reverses its curvature.

Still further features of the present invention consist in certain novel features of construction, combinations and arrangements of parts hereinafter described and claimed, the advantages of which will be obvious to those skilled in the art from the following description.

In the accompanying drawings illustrating the preferred form of the invention,

Corresponding numerals indicate corresponding and like parts in the two views.

Figure 1:
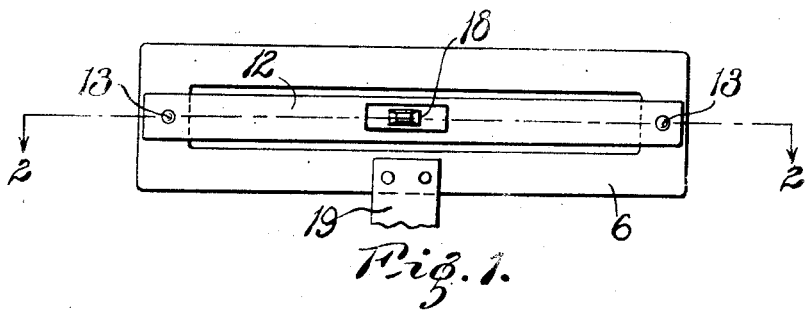
Fig. 1 is a plan view of the control device taken from the bottom.
Figure 2:
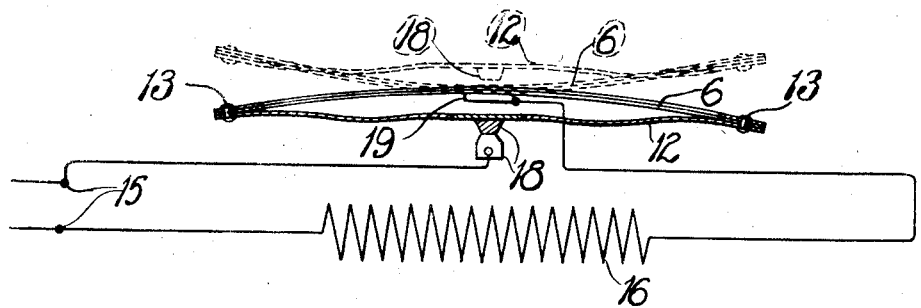
Fig. 2 is a cross-section taken on the line 2—2 of Fig. 1 and shows a possible circuit connection.

Referring now more particularly to Fig. 1, the numeral 6 indicates a composite, curved, thermostatic strip. The thermostatic strip 6 may be in the form of a hollow rectangle having a resilient, metallic member 12 rigidly connected to spaced points, such as by rivets 13 to the opposite ends. This metallic strip 12 which may be of spring steel has the opposite end portions arched or flexed or deflected slightly, as shown in Fig. 2, for a purpose to be presently described. With such a construction initial changes in temperature do not materially change the position of the strip 12. Upon reaching a predetermined temperature limit, the distortion of the ends of the rectangle 6 snaps the member 12 therethrough into the position shown in dotted lines, causing an abrupt opening of a circuit.

The action probably occurs in the following manner: The thermostatic strip is initially in stable equilibrium and is flexed by the compressive supporting effect of the resilient means 12, the flexure being in the form of a simple curve. Initial temperature changes are productive of increasing stresses with resultant increasing strains in the thermostatic strip. As increasing temperature changes occur, the thermostatic strip builds up further stresses, whereby the thermostatic strip delineates a compound curve under compressive effect of the strip 12 and stores such additional stresses, and may be described as being in a condition of unstable equilibrium. At the predetermined, critical temperature the stored stresses have accumulated to the extent that both the thermostatic and resilient members suddenly snap, or are forced across their axes of pressure, thereby changing both their positions and their curvatures. In the resultant position of stable equilibrium, the thermostatic strip is again in the form of a simple curve. As indicated in the drawings, the circuit may comprise terminals 15, heating coil 16, together with the stationary and movable contacts 18, one of which is carried upon the member 12.

The contact 18 on the strip 12 may be inlaid or otherwise conveniently attached to said strip. The composite, thermostatic strip or rectangle 6 is fastened at any convenient point to an anchoring member 19.

It will be evident that the heating coil may be embodied in a suitable type of electrical apparatus, such as a sadiron, and the thermostatic control employed for suddenly opening the heating circuit when a predetermined temperature is reached. In addition to automatically opening the circuit upon reaching a predetermined temperature limit, this form of thermostatic control automatically returns to normal position when the temperature has dropped to a predetermined point, the thermostatic strip at this time reversing its curvature and returning to the position shown in full lines.

The words bimetallic and thermostatic, as used herein, are not to be taken as limiting the structure to any particular combination of materials having different thermal coefficients of expansion but are intended to embrace in their scope any combination of materials having dissimilar thermal coefficients of expansion sufficient to cause the characteristic change of curvature. Further, the materials comprising the composite, thermostatic structure may be secured together in any desired manner, such as by riveting, soldering, welding, brazing or otherwise.

It will be understood that reference to change of position of the member 12 is inclusive of whatever changes of shape take place therein.

While it is preferred to employ the specific construction and arrangement of parts shown and described it will be understood that this construction and arrangement is not essential except so far as specified in the claims and may be changed or modified without departing from the broader features of the invention.

The invention having been described, what is claimed is:

1. A thermostatic control comprising a bow-shaped thermostatic strip, a resilient metallic member connected to the strip, the strip being maintained in a flexed condition thereby in such a manner that the strip snaps across an axis of pressure and causes a sudden change of position of the resilient metallic member connected thereto.

2. A thermostatic control comprising a thermostatic frame, a resilient metallic strip connected to the frame at opposite ends, the frame being maintained in a flexed condition such that predetermined distortion of the frame causes the strip to snap across an axis of pressure.

3. A thermostat comprising a theremostatic strip, an arched resilient member connected to the strip and adapted to suddenly change its position as the strip snaps across an axis of pressure.

4. A thermostatic control comprising a thermostatic strip, a resilient member connected between two points on the strip and being of a length adapted to positively maintain the strip in a curved condition throughout the stages of its movement, whereby change in temperature gradually strains the strip without substantial lateral movement and subsequently abruptly reverses the curvature of the strip to substantially move said resilient member laterally of its length.

5. A thermo-responsive controlling device comprising an initially stressed and curved thermostatic member, a fixed contact, a movable contact cooperating therewith, a contact-carrying member connected to the thermostatic member at separated points, and pressing said contact against the fixed contact during initial changes in temperature said contact-carrying member being of such length to prevent straightening of the thermostatic member at any stage of its movement, whereby the thermostatic member changes suddenly its own position and the position of the contact-carrying member on reaching a predetermined temperature and thereupon separates said contacts abruptly.

6. A thermo-responsive device consisting of a flexible thermostatic strip, means disposed at spaced points thereof and adapted to stress and hold said strip curved at all stages of its movement, at least part of said means being resilient cooperating contacts, one relatively fixed and the other connected to said resilient means, the resilient means maintaining said contacts together during approach of the temperature to a predetermined critical point, whereupon the stored stresses cause the device to reach a condition of instability, whereupon the thermostatic strip and resilient means suddenly change position and said movement of the resilient means suddenly separates said contacts.

7. A thermostatic device comprising a thermostatic member, means operatively connected to spaced points thereof and maintaining the thermostatic member at all times in a flexed condition and compressing said thermostatic member longitudinally, said compression increasing as the device approaches a predetermined critical temperature, until at said temperature the stored stresses cause said means and said member suddenly to change their respective positions.

8. A thermostatic device comprising an initially curved bimetallic strip and means cooperating with the opposite ends thereof, adapted first to resist the tendency of said strip to change its curvature in response to strains within said strip due to temperature changes, and then to aid said strip in assuming its new shape in response to the strains induced therein by temperature changes, said strip delineating a simple curve at the beginning and end of its movement, but a compound curve at intermediate portions of its movements.

9. A thermostatic device comprising a flexible, bimetallic strip means cooperating with the ends thereof to cause said strip to have the shape of a simple curve at positions of stable equilibrium and to assume the shape of a compound curve at positions of unstable equilibrium.

10. A thermostat comprising a bimetallic element, supporting means associated with the opposite ends of said element, the supporting means comprising a resilient element, both of said elements being initially maintained in flexed condition, a stationary contact member, and a movable contact member connected with said second element, one of said elements having a compound curve as it approaches an axis of pressure and then abruptly changing curvature for a quick separation of said contact members.

11. A thermostat comprising a thermostatic strip, means connected to spaced points of said strip and compressing the intermediate strip portions longitudinally and holding said strip curved at all stages of its movement, the means cooperating with at least one of said points comprising a resilient element, a stationary contact member, and a movable contact member connected with said second element, said elements tending to increasingly stress themselves as they approach a condition of instability due to temperature change, said resilient element maintaining said contact members pressed together during said change, until at a predetermined temperature the stored stresses in said elements cause them to change their position abruptly thereby effecting a quick separation of said contact members.

12. A thermostatic switch comprising a bimetallic strip, means for supporting said strip, said means comprising a resilient support for at least one end of said strip, said resilient support being operatively connected to a contact making and breaking device, said resilient support and strip end having actions and reactions which tend to bow said strip and, when temperature changes occur, said strip tending to deform said resilient support, assuming a compound curve in approaching a position of instability and then abruptly changing its curvature, said resilient support suddenly assuming a new position and causing said contact making and breaking device to be operated.

13. A thermostatic switch comprising a bimetallic strip, means for supporting said strip, said means comprising a resilient support for at least one end of said strip, said resilient support being operatively connected to a contact making and breaking device, said resilient support and strip end having actions and reactions which tend to bow said strip and, when temperature changes occur, said strip tending to deform said resilient support, said strip having a compound curve in approaching a position of instability and then abruptly changing its curvature, said resilient support suddenly assuming a new position and causing said contact making and breaking device to be operated, said resilient support comprising means to keep the contact making and breaking device in good electrical contact when in closed position during the period when said strip approaches the condition of instability.

14. A thermostat comprising a thermostatic strip, a substantially rigid, resilient mounting engaging said strip at points spaced apart a distance less than the distance between the same points of the strip when it is straight, a fixed contact, a movable contact pressed thereagainst by the resilience of said mounting normally and during initial changes of temperature, the mounting compressing the strip longitudinally, whereby upon reaching a predetermined temperature, the stored stresses snap the strip and mounting from said normal position of stable equilibrium to another position of stable equilibrium, and abruptly separate said contacts.

In testimony whereof, I have signed my name to this specification this 25th day of July, 1925.

JOHN A. SPENCER.